United States Patent
Herd et al.

(10) Patent No.: US 7,810,715 B2
(45) Date of Patent: Oct. 12, 2010

(54) SELF-SERVICE TERMINAL

(75) Inventors: Stewart J. Herd, Perth & Kinross (GB); Alexander Russell, Fife (GB)

(73) Assignee: NCR Corporation, Duluth, GA (US)

( * ) Notice: Subject to any disclaimer, the term of this patent is extended or adjusted under 35 U.S.C. 154(b) by 392 days.

(21) Appl. No.: 12/012,177

(22) Filed: Jan. 31, 2008

(65) Prior Publication Data

US 2009/0195993 A1 Aug. 6, 2009

(51) Int. Cl.
*G06Q 40/00* (2006.01)
*G07D 11/00* (2006.01)
*G07F 19/00* (2006.01)

(52) U.S. Cl. .................. 235/379; 235/375; 235/381; 705/43; 902/9

(58) Field of Classification Search .......... 235/379, 235/375, 381, 380; 902/9, 30–31; 705/43, 705/73
See application file for complete search history.

(56) References Cited

U.S. PATENT DOCUMENTS

| | | | |
|---|---|---|---|
| 5,642,922 A | 7/1997 | Ramachandran et al. | |
| 7,416,111 B1 * | 8/2008 | Kovacs et al. | 235/379 |
| 7,661,584 B1 * | 2/2010 | Lute et al. | 235/379 |
| 2002/0074393 A1 * | 6/2002 | Anderson et al. | 235/379 |
| 2004/0099726 A1 | 5/2004 | Magee et al. | |
| 2004/0222296 A1 | 11/2004 | Douglass et al. | |

FOREIGN PATENT DOCUMENTS

EP    0 924 668 A2    6/1999

* cited by examiner

*Primary Examiner*—Edwyn Labaze
(74) *Attorney, Agent, or Firm*—Paul W. Martin

(57) ABSTRACT

A fascia for a self-service terminal. The fascia comprises a first component located in fixed spatial relation to a plurality of devices mounted within the self-service terminal, and a second component mounted in movable spatial relation to at least one other device mounted within the self-service terminal. The second component is movable relative to the first component to provide access to the devices mounted within the self-service terminal when the second component is opened. The first and second components provide a unitary sealed fascia when the first and second components are in the closed position.

18 Claims, 3 Drawing Sheets

SELF-SERVICE TERMINAL

FIELD OF INVENTION

The present invention relates to a self-service terminal.

BACKGROUND OF INVENTION

One common type of self-service terminal is an automated teller machine (ATM). To provide an ATM owner with a high return on investment, it is imperative that an ATM remains in operation for as long as possible. To this end, ATMs are designed to ensure that they can be serviced quickly and efficiently by ATM technicians.

ATMs contain quite a number of devices, such as a cash dispenser, a card reader, a receipt printer, and the like. These devices enable the ATM to perform transactions for customers. Access to these devices may be provided from the rear of the ATM, and/or from the front of the ATM. Where front access is provided, an ATM is typically provided with a fascia on the front of the ATM that either (i) pivots upwards, or (ii) racks out (slides out like a drawer). Whichever mounting mechanism is used (a pivot or a slide), when the fascia is opened, the devices mounted within the ATM are exposed to enable an ATM technician to gain access to them.

One disadvantage of these mounting mechanisms (a pivot and a slide) is that devices mounted within the ATM may not be correctly aligned with corresponding slots in the fascia when the fascia is moved to the closed position. Furthermore, if these devices are not properly positioned when the fascia is closed, then the devices or the fascia may be damaged. This misalignment and potential damage gives rise to a relatively large number of additional service calls for ATM technicians. As a consequence, there may be an increased service charge (where third party ATM technicians are used) and reduced ATM availability for customers.

SUMMARY OF INVENTION

Accordingly, the invention generally provides an improved fascia for a self-service terminal.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a fascia for a self-service terminal, the fascia comprising: a first component located in fixed spatial relation to a plurality of devices mounted within the self-service terminal, and a second component mounted in movable spatial relation to at least one other device mounted within the self-service terminal, the second component being movable relative to the first component to provide access to the devices mounted within the self-service terminal when the second component is opened, and providing a unitary sealed fascia when the second component is closed.

The first component may be an inner component and the second component may be an outer component surrounding the inner component.

The first component may include a customer display mounted thereto. This allows a service technician (such as an ATM technician) to view the customer display (which may be displaying instructions for the service technician) while performing a servicing operation. This has the advantage that a secondary display for use in performing servicing operations may not be required.

The first component may include apertures (such as slots), each aperture aligning with an entry/exit port on a central device. These central devices may include: a card reader, a receipt printer, a statement printer, a passbook printer, and the like.

The first component and its associated central devices may be mounted on a tray sliding on a rail mechanism, thereby allowing the first component and the central devices to be accessed by sliding the tray out from a closed position, where the first component is fully racked (and latched) into the self-service terminal, to an open position, where the first component is fully racked out.

The second component may be pivotably mounted to an upper portion of the self-service terminal, thereby allowing the second component to pivot upwards to an open position at which the devices within the self-service terminal are exposed, and downwards to a closed position, at which the second component is in sealing engagement with the first component and the second component is latched to the self-service terminal. Alternatively, the second component may be slideably mounted to the self-service terminal, thereby allowing the second component to be racked out from a closed position to an open position.

The second component may include an inwardly projecting portion for urging a fixture (such as a sloping bar, a hooked stanchion, or the like) on the sliding tray rail mechanism towards a closed position. If the first component is not in the closed position when the second component is pivoted downwards, then the projecting portion engages with the fixture and moves the sliding tray mechanism to the closed position as a result of the second component being moved to its closed position. This automatic closing feature ensures that if the second component is closed while the first component is still racked out, then the first component will be safely racked in by the action of closing the second component.

The inwardly projecting portion may be provided by a sheet metal enclosure for a light box.

A sealing gasket may be provided on one or both of the first component and the second component. The sealing gasket may surround the first component.

The second component may provide access to the self-service terminal interior, and also provide access to a cash dispenser shutter.

The second component may be mounted in movable spatial relation to a cash dispenser and/or a banknote depository mounted within the self-service terminal.

The fascia may provide a customer interface (including, for example, slots, a display, a keypad, and the like) in a first plane, and an information panel in a second plane transverse to the first plane, the information panel comprising a first energizable graphic and a second energizable graphic.

The information panel may be provided on the second component. The information panel may be provided on an edge of the second component.

The first and second energizable graphics may be provided as two separate series of LEDs mounted on a common printed circuit board. The first series may be in the form of a single or double headed arrow, the second series may be in the form of a cross.

The first energizable graphic may be in the form of an arrow (such as a green single or double-headed arrow pointing to the front of the terminal), the second energizable graphic may be in the form of a cross (such as a red cross).

Each graphic is preferably separately energizable, so that only one graphic is energized at any given time.

The fascia may be for use with a drive-up self-service terminal, such as a drive-up ATM.

By providing an information panel that is visible to potential customers of the terminal approaching the terminal from one side rather than the front of the terminal, vehicle drivers can ascertain from a distance whether the terminal is operational. Where multiple self-service terminals are used in a location, each in a different lane, a vehicle driver can select a lane having an operational self-service terminal, as indicated by the information panel.

According to a second aspect there is provided a self-service terminal including the fascia of the first aspect.

By virtue of this aspect, a self-service terminal is provided that has a dual component fascia. One component may be used to ensure that critical alignment with certain devices (for example a card reader and various printers) is always maintained, the other component may be used to ensure that sufficient access is provided to the self-service terminal interior to ensure that servicing operations can be easily and reliably performed.

According to a third aspect of the invention there is provided a self-service terminal fascia comprising an information panel disposed on a plane transverse to the plane of a customer interface used by a customer of the terminal to conduct a transaction, the information panel comprising a first energizable graphic for indicating that the self-service terminal is in service, and a second energizable graphic for indicating that the self-service terminal is not in service.

The first energizable graphic may be an arrow, and the second energizable graphic may be a cross.

The first energizable graphic may be green, the second energizable graphic may be red.

The first and second energizable graphics may be co-located on the same general area of the information panel.

According to a fourth aspect there is provided a fascia for a self-service terminal, the fascia comprising: a first component located in fixed spatial relation to a plurality of devices mounted within the self-service terminal, and a second component mounted in movable spatial relation the first component to provide access to the devices mounted within the self-service terminal when the second component is opened.

These and other aspects will be apparent from the following specific description, given by way of example, with reference to the accompanying drawings.

DETAILED DESCRIPTION

Figure 1:
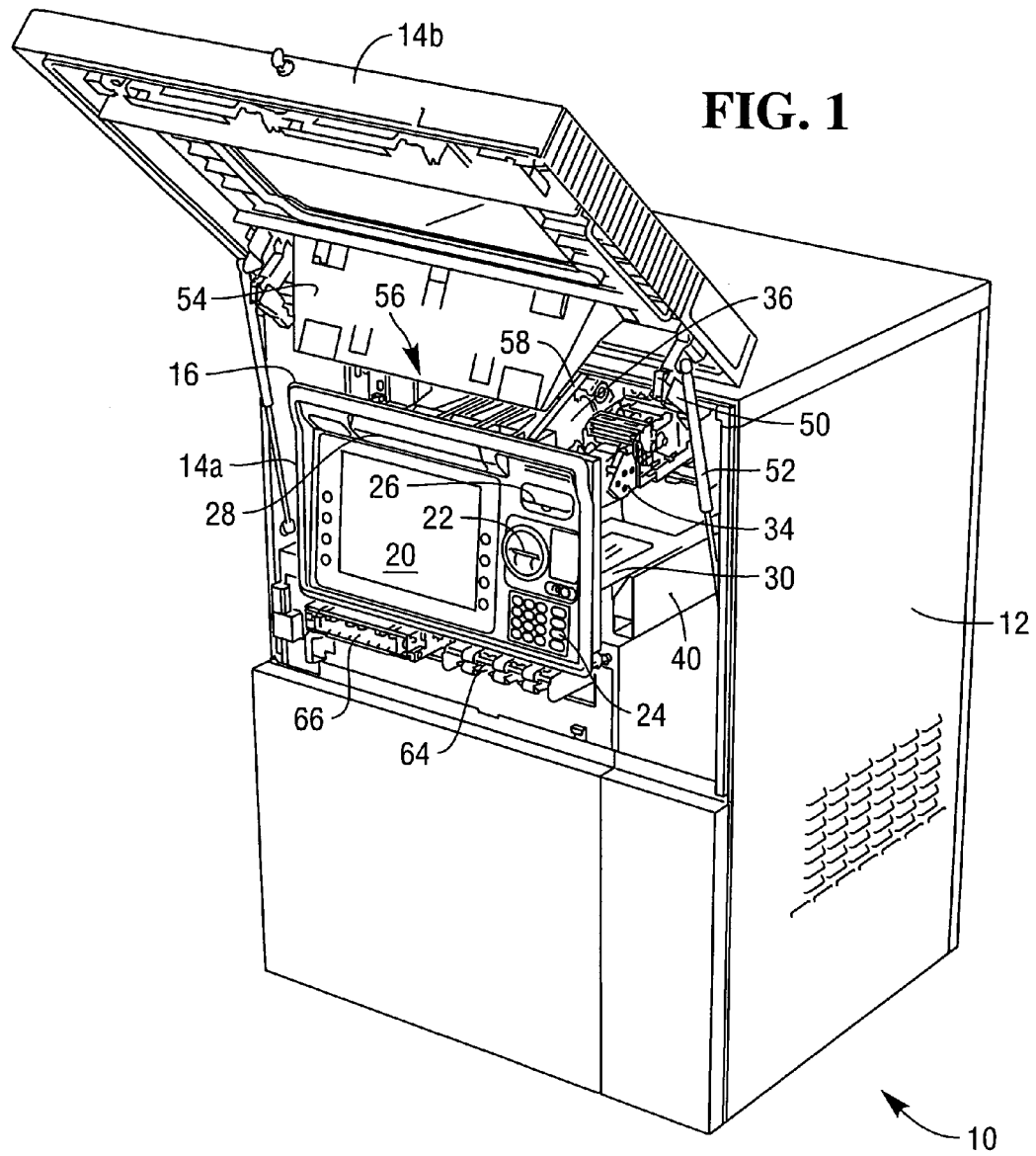
FIG. 1 is a perspective view of a self-service terminal according to one embodiment of the present invention showing a part (the second fascia component) in the open position.

Reference is first made to FIG. 1, which is a perspective view of a self-service terminal 10 (in the form of a drive-up ATM) according to one embodiment of the present invention. This is the view that would be seen by an ATM technician during a maintenance (servicing) operation.

The ATM 10 comprises a housing 12 to which is coupled a two-part fascia 14. The two-part fascia 14 comprises a first (inner) fascia component 14a, and a second (outer) fascia component 14b defining a central aperture dimensioned to accommodate the inner fascia component 14a in sealing engagement when the outer fascia component 14b is in a closed position. The inner fascia component 14a includes a perimeter gasket 16 to ensure a water-tight seal with the outer fascia component 14b.

The inner fascia component 14a includes a display 20 mounted thereon, a card reader entrance/exit port 22 including an anti-fraud hologram, an encrypting PINpad device 24, a receipt printer slot 26, and a statement printer slot 28.

The inner fascia component 14a is mounted on a device tray 30 that supports various internal ATM devices, (referred to herein as central devices) such as a card reader (not shown) aligned with the card reader entrance/exit port 22; a receipt printer 34 aligned with the receipt printer slot 26; and a statement printer 36 aligned with the statement printer slot 28.

The device tray 30 is slideably mounted on a rail mechanism 40, thereby allowing the device tray 30 and the devices 20,24,34,36 supported thereon, to be racked horizontally out of the ATM 10 for servicing by an ATM technician, and to be racked back into the ATM 10 when servicing is complete.

The inner fascia component 14a is fixed relative to the card reader (not shown), receipt printer 34, and statement printer 36. This ensures that there is no misalignment between each device supported by the tray 30 and its associated slot or port. In some ATMs, up to 60% of service callouts requiring a visit from an ATM technician are attributable to misalignment of devices with their respective slots or the devices not being properly racked back in place prior to closing the fascia. Since there is no relative movement between the inner fascia component 14a and the devices supported by the tray 30, these misalignment problems are greatly reduced in this embodiment.

The outer fascia component 14b is pivotably mounted by hinges 50 (only one of which is shown in FIG. 1) to an upper portion of the ATM 10, and is maintained in an open position (as shown in FIG. 1) by a gas spring 52.

The outer fascia component 14b includes a projecting portion 54 defining an edge 56 for engaging with a sloping bar 58 on the device tray 30. The bar 58 slopes from a high position at the rear of the device tray 30 to a low position at the front of the device tray 30 where the inner fascia component 14a is mounted.

If the outer fascia component 14b is lowered while the inner fascia component 14a is racked out, then the edge 56 of the projecting portion 54 comes into contact with the bar 58. If the outer fascia component 14b continues to be lowered, then it urges the bar 58 and the device tray 30 to the closed position as the outer fascia component 14b is lowered.

Figure 2:
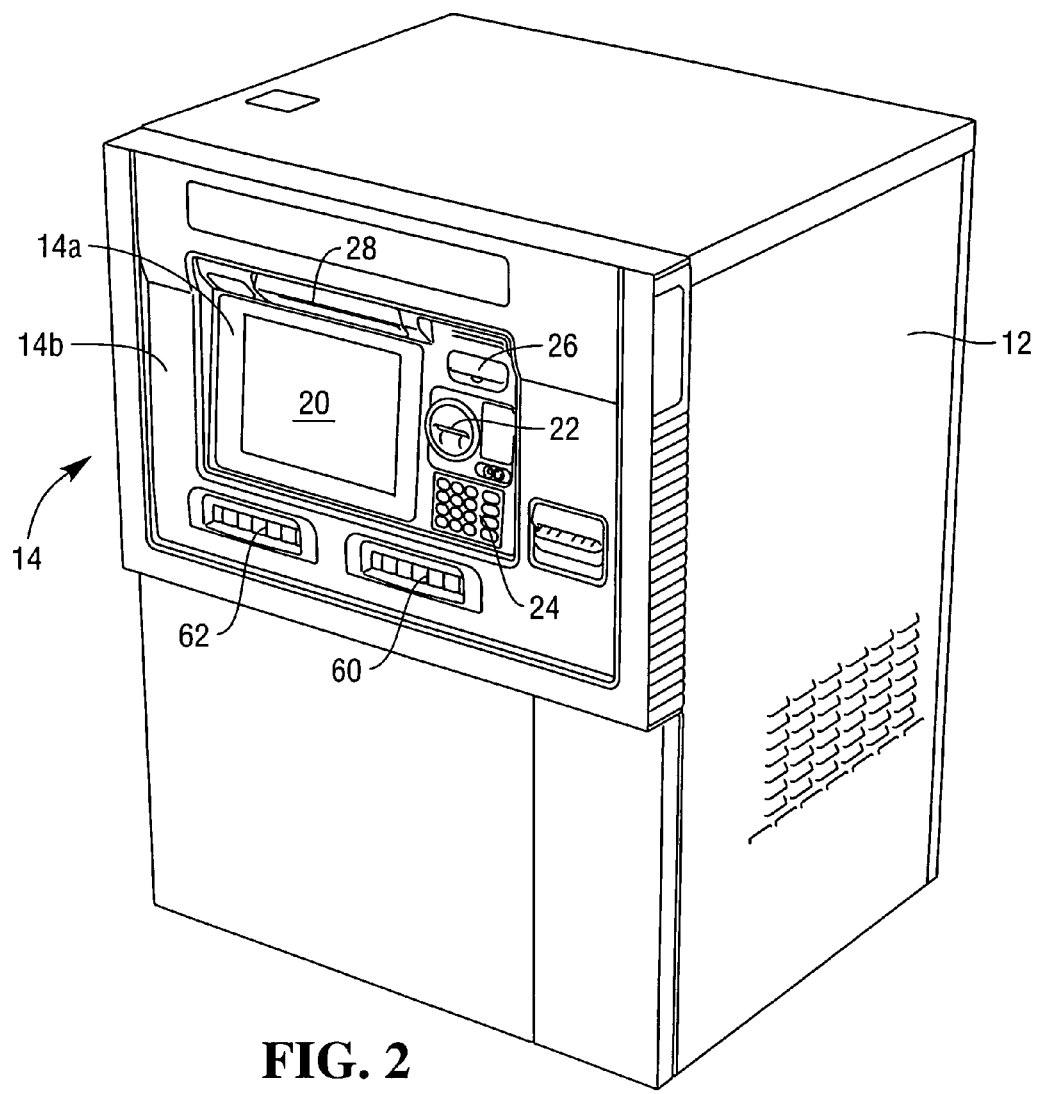
FIG. 2 is a perspective view of the self-service terminal of FIG. 1 showing the second fascia component in the closed position.

Reference will now also be made to FIG. 2, which is a perspective view of the ATM 10 showing the inner and outer fascia components 14 in the closed position. As best seen from FIG. 2, the outer fascia component 14b also includes a cash dispenser slot 60 and a banknote deposit slot 62.

When the outer fascia component 14b is in the closed position, the cash dispenser slot 60 aligns with a cash dispenser device 64 that is located in a safe (not shown) within a lower portion of the ATM 10; and the banknote depository slot 62 aligns with a banknote depository device 66 that is also located in the safe (not shown) within a lower portion of the ATM 10.

During normal operation, when an ATM technician has completed a maintenance operation on the ATM 10, then he/she can rack in the inner fascia component 14a, and then close the outer fascia component 14b. The ATM 10 will then be ready for use, as illustrated in FIG. 2.

As described above, even if the ATM technician forgets to rack in the inner fascia component 14a prior to closing the outer fascia component 14b, the inner fascia component 14a will be closed automatically by the action of the projecting portion 54 and the sloping bar 58, thereby preventing damage to the inner fascia component 14a and device tray 30.

Figure 3:
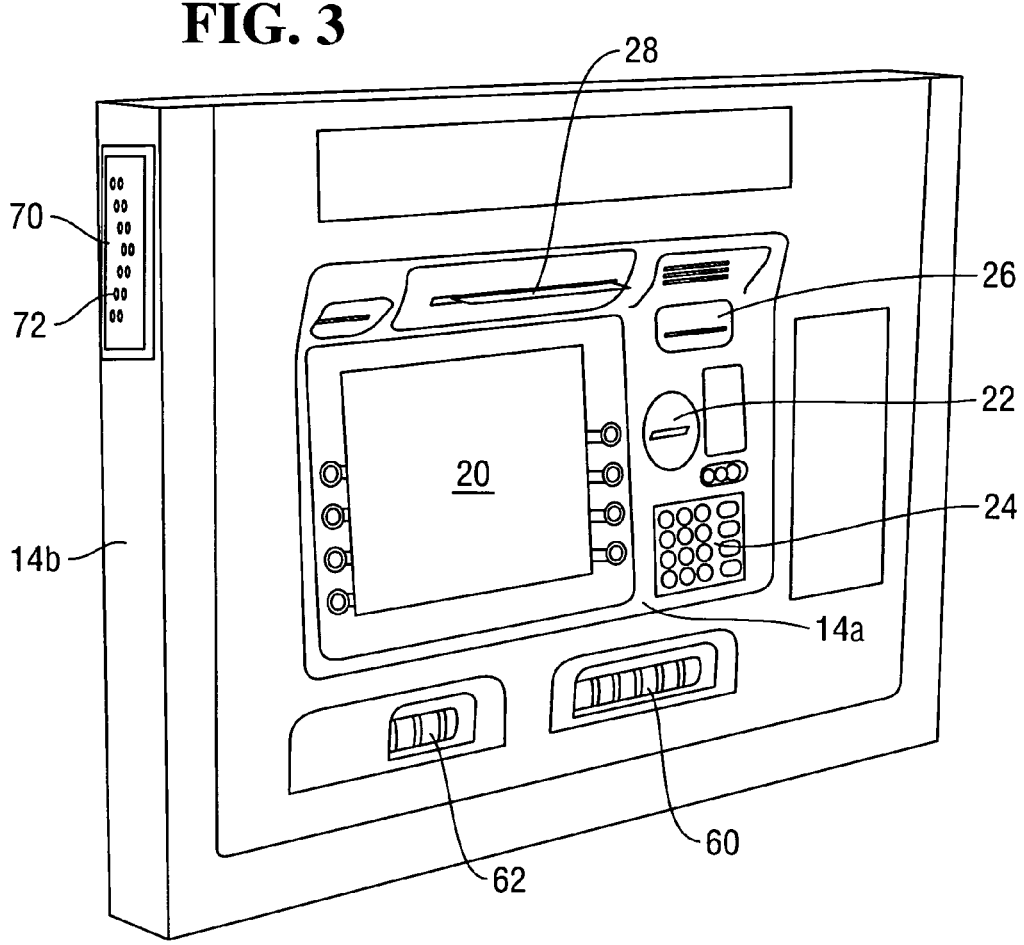
FIG. 3 is a side view of the self-service terminal of FIG. 1 showing an information panel.
Figure 4:
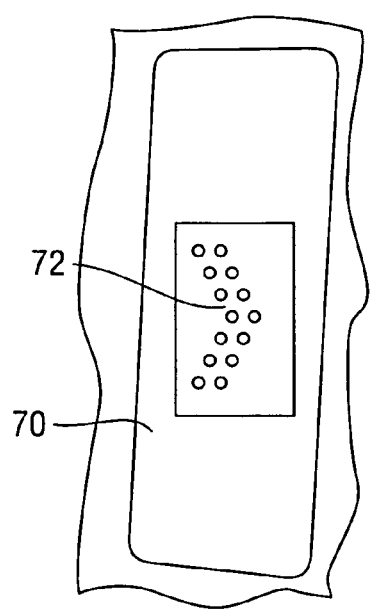
FIG. 4 is an enlarged view of the information panel of FIG. 3 in a first energized state indicating that the terminal of FIG. 1 is in service.
Figure 5:
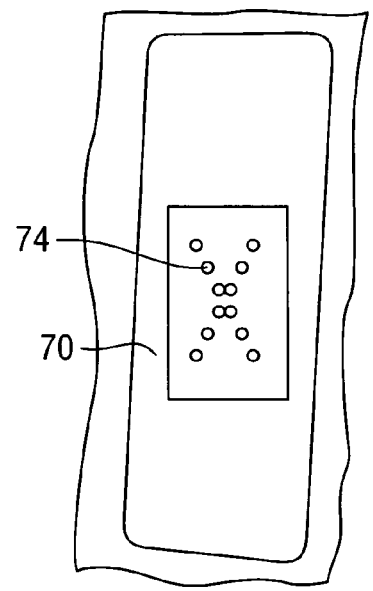
FIG. 5 is an enlarged view of the information panel of FIG. 3 in a second energized state indicating that the terminal of FIG. 1 is out of service.

Reference will now be made to FIG. 3, which is a side view of the ATM 10. As can be seen from FIG. 3, the outer fascia component 14b includes an information panel 70. As best seen in FIGS. 4 and 5, the information panel 70 has a first energizable graphic 72 and a second energizable graphic 74.

The first energizable graphic 72 is in the form of a series of green LEDs forming a double-headed arrow pointing towards a front area of the ATM 10, which signifies to ATM customers approaching the ATM 10 from the side, such as vehicle drivers, that the ATM 10 is in service.

The second energizable graphic 74 is in the form of a series of red LEDs forming a cross, which signifies to ATM customers approaching the ATM 10 from the side, such as vehicle drivers, that the ATM 10 is out of service.

The series of green LEDs and the series of red LEDs are disposed on the same circuit board and covered by a translucent diffusing sheet, so that only the green double-headed arrow (not the red cross) is visible when the first energizable graphic 72 is activated; and only the red cross (not the green double-headed arrow) is visible when the second energizable graphic 74 is activated.

The first and second energizable graphics 72,74 are separately energized on a mutually exclusive basis, so that if the first energizable graphic 72 is illuminated then the second energizable graphic 74 is not illuminated, and vice versa.

When the ATM 10 is operating correctly, an ATM controller (not shown) such as a PC core, illuminates the first energizable graphic 72 (the green arrow); whereas, when the ATM 10 is not operating correctly (that is, when the ATM 10 is not in service), the ATM controller (not shown) illuminates the second energizable graphic 74 (the red cross). This enables prospective customers approaching the ATM 10 to see from a distance whether the ATM 10 is in operation or not.

If the ATM 10 is used in multi-lane, drive-up installations, the information panel 70 provides an indication of which ATMs are in service. This avoids drivers having to reverse or pass through the drive-up lane and rejoin a queue to select another lane with an in-service ATM.

By using the information panel 70, the ATM 10 provides a highly visible indicator that shows the status of the ATM 10. This indicator is highly visible and can be seen before the driver needs to select a lane.

Various modifications may be made to the above described embodiment within the scope of the invention, for example, a self-service terminal other than an ATM may be used, such as a self-checkout terminal.

In other embodiments, the outer fascia component may rack out rather than pivot up.

In other ATM embodiments, the outer fascia component may include an aperture for receiving deposited cheques. The aperture may align, when the outer component is in the closed position, with a cheque processing device mounted within the ATM.

In other embodiments, the information panel may have different graphics than those described (for example, a tick instead of an arrow), and the colors may be different to those described (for example, black instead of red).

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

What is claimed is:

1. A fascia for a self-service terminal, the fascia comprising:
   a first component located in fixed spatial relation to a plurality of devices mounted within the self-service terminal, and
   a second component mounted in movable spatial relation to at least one other device mounted within the self-service terminal, the second component being movable relative to the first component to provide access to the devices mounted within the self-service terminal when the second component is opened, and providing a unitary sealed fascia when the second component is closed against the first component, the first component separating the second component from the at least one other device when the second component is closed against the first component.

2. A fascia according to claim 1, wherein the first component is an inner component and the second component is an outer component defining an aperture for surrounding the inner component when both components are in a closed position.

3. A fascia according to claim 1, wherein the first component includes a customer display mounted thereto.

4. A fascia according to claim 1, wherein the first component includes apertures, each aperture aligning with an entry/exit port on a central device.

5. A fascia according to claim 1, wherein the first component and its associated central devices are supported by a tray slideably mounted on a rail mechanism, thereby allowing the first component and the central devices to be accessed by sliding the tray out from a closed position, where the first component is fully racked in to the self-service terminal, to an open position, where the first component is fully racked out.

6. A fascia according to claim 5, wherein, the second component includes an inwardly projecting portion for engaging with a complementary groove on the sliding tray rail mechanism.

7. A fascia according to claim 1, wherein the second component is pivotably mounted to an upper portion of the self-service terminal, thereby allowing the second component to pivot upwards to an open position at which the devices within the self-service terminal are exposed, and downwards to a closed position, at which the second component is in sealing engagement with the first component.

8. A fascia according to claim 1, wherein, the second component is slideably mounted to the self-service terminal, thereby allowing the second component to be racked out from a closed position to an open position.

9. A fascia according to claim 1, wherein, a sealing gasket is provided on either the first component or the second component.

10. A fascia according to claim 1, wherein the second component provides an information panel transverse to a plane of the first component, the information panel comprising a first energizable graphic and a second energizable graphic.

11. A fascia according to claim 10, wherein the first energizable graphic is in the form of a green arrow pointing to the front of the terminal, and the second energizable graphic is in the form of a red cross.

12. A fascia according to claim 11, wherein each graphic of the first and second energizable graphics is separately energizable, so that only one graphic is energized at any given time.

13. A self-service terminal comprising:
a first facia portion located in fixed spatial relation to a plurality of devices mounted within the self-service terminal, and
a second facia portion mounted in movable spatial relation to at least one other device mounted within the self-service terminal, the second facia portion being movable relative to the first facia portion to provide access to the devices mounted within the self-service terminal when the second component is opened, and providing a unitary sealed fascia when the facia portion is closed against the first facia portion, the first facia portion separating the second facia portion from the at least one other device when the second facia portion is closed against the first facia portion.

14. A self-service terminal fascia comprising an information panel disposed on a plane transverse to the plane of a customer interface used by a customer of the terminal to conduct a transaction, the information panel comprising a first energizable graphic for indicating that the self-service terminal is in service, and a second energizable graphic for indicating that the self-service terminal is not in service.

15. A fascia for a self-service terminal, the fascia comprising:
a first component located in fixed spatial relation to a plurality of devices mounted within the self-service terminal, and
a second component mounted in movable spatial relation to at least one other device mounted within the self-service terminal, the second component being movable relative to the first component to provide access to the devices mounted within the self-service terminal when the second component is opened, and providing a unitary sealed fascia when the second component is closed;
wherein the second component provides an information panel transverse to a plane of the first component, the information panel comprising a first energizable graphic and a second energizable graphic.

16. A fascia according to claim 15, wherein the first energizable graphic is in the form of a green arrow pointing to the front of the terminal, and the second energizable graphic is in the form of a red cross.

17. A fascia according to claim 16, wherein each graphic of the first and second energizable graphics is separately energizable, so that only one graphic is energized at any given time.

18. A fascia for a self-service terminal, the fascia comprising:
a first portion including a frame portion mounted to a tray in fixed spatial relation around a device mounted within the tray; and
a second portion containing an aperture exposing the device to a user when the second portion is in a closed position against the first portion, the second portion being moveable away from the first portion to an open position to provide access to the device mounted within the tray, the first portion protecting the device against contact with the second portion when the second portion is returned to the closed position.

* * * * *